United States Patent [19]
Rorden

[11] 3,800,213
[45] Mar. 26, 1974

[54] THREE AXIS TOROIDAL FLUXGATE TYPE MAGNETIC SENSOR

[75] Inventor: Louis H. Rorden, Menlo Park, Calif.
[73] Assignee: Develco, Inc., Mountain View, Calif.
[22] Filed: Oct. 24, 1972
[21] Appl. No.: 299,696

[52] U.S. Cl. ............................ 324/43 R, 340/197
[51] Int. Cl. ........................................ G01r 33/04
[58] Field of Search .............. 324/43 R, 43 G, 47; 340/197; 33/361

[56] References Cited
UNITED STATES PATENTS

| | | | |
|---|---|---|---|
| 2,389,146 | 11/1945 | Fragola et al. | 324/43 R |
| 2,597,125 | 5/1952 | Noxon | 324/43 R |
| 2,961,604 | 11/1960 | Schuchard | 324/43 R |
| 3,218,547 | 11/1965 | Ling | 324/47 |
| 3,696,518 | 10/1972 | Leat | 33/361 |

OTHER PUBLICATIONS
Geyger, W., Flux Gate Magnetometer; Electronics June 1, 1962, pp. 48–52.

Primary Examiner—Robert J. Corcoran

[57] ABSTRACT

A magnetically permeable core of a fluxgate type magnetic sensor has first, second and third sensing coils magnetically coupled to the core. Each of the sensing coils has a different magnetic axis for inducing therein three different time varying signal components of respective magnitudes corresponding to that component of the magnetic field vector to which the sensor is exposed and which is parallel to the magnetic axis of the respective sensing coil. In a preferred embodiment the magnetic axes of the sensing coils are mutually orthogonal and the core is a hollow cylinder approximately equal in diameter and length. The driving coil for producing a time varying permeability in the core is wound on the core such that the magnetic axis of the winding is circular and entirely within the core. A pair of such three axes sensors are spaced apart on a holder and similarly oriented such that their respective outputs can be subtracted to derive three gradiometer outputs.

19 Claims, 6 Drawing Figures

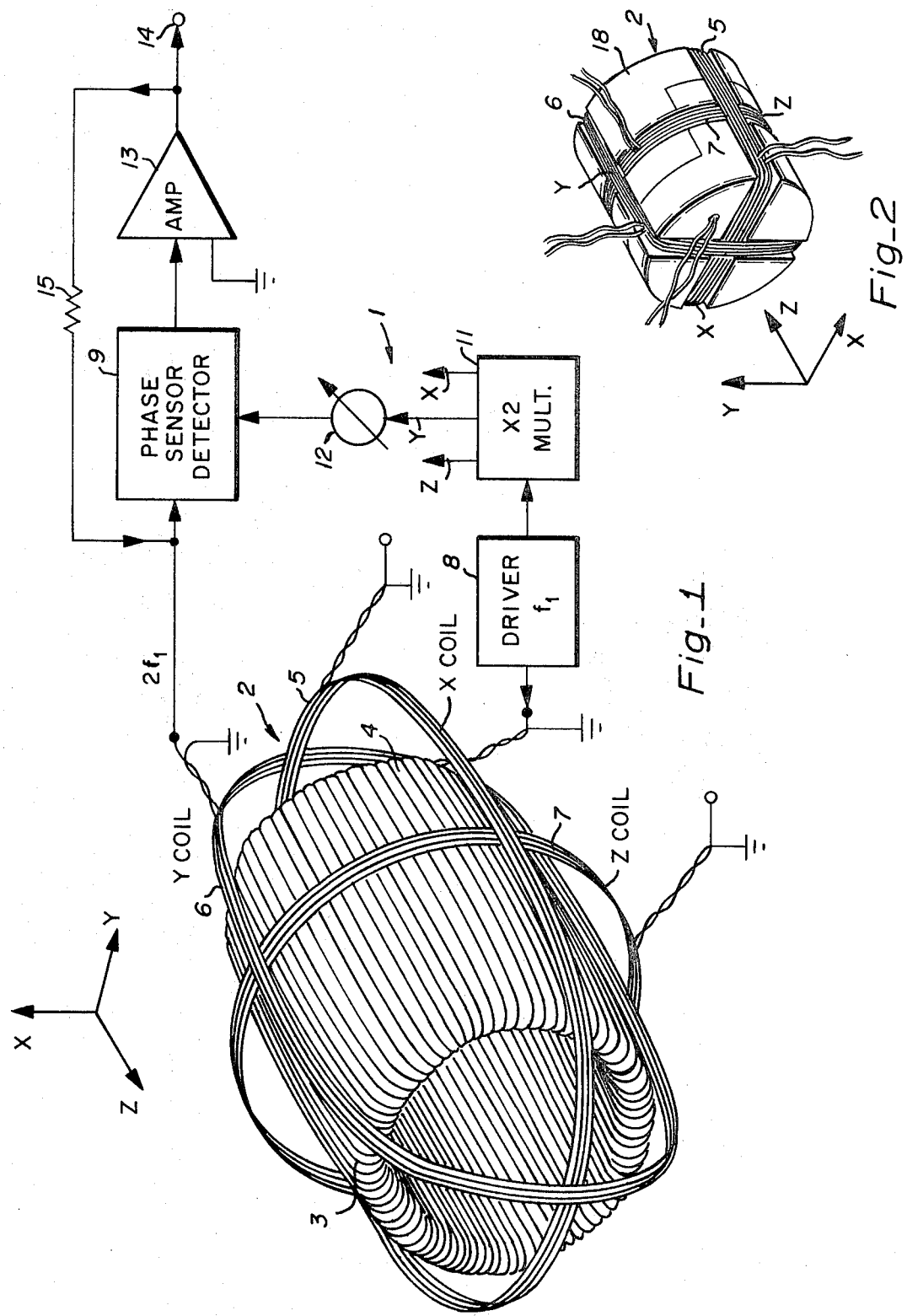

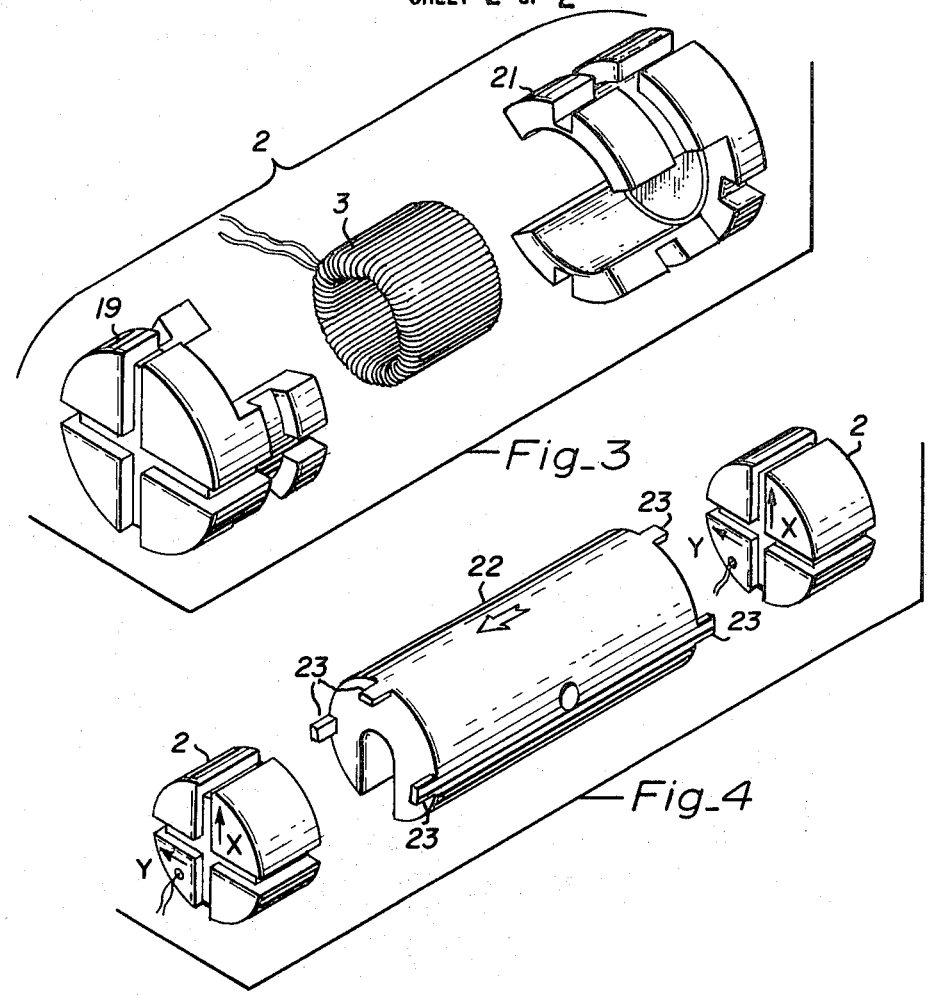
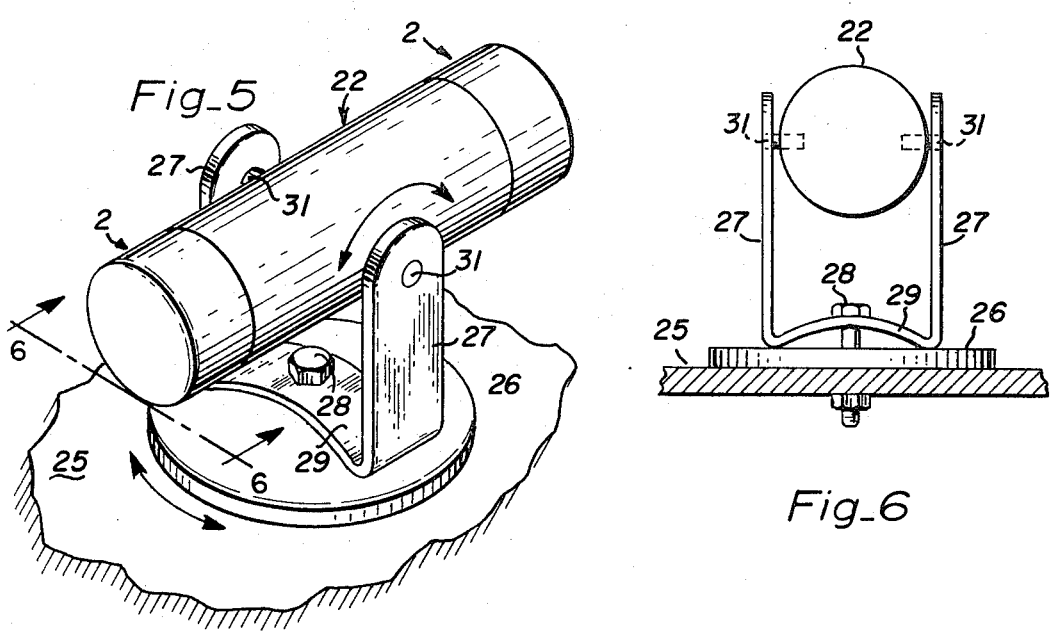

THREE AXIS TOROIDAL FLUXGATE TYPE MAGNETIC SENSOR

BACKGROUND OF THE INVENTION

Heretofore, fluxgate type magnetic sensors have employed a ring shaped highly magnetically permeable core, as of mu-metal, having a driver winding thereon energized with current at a fundamental frequency to produce saturation of the core at harmonics of the drive frequency. Sensor coils have been wound around the core with mutually orthogonal magnetic axes lying in a plane transverse to the axis of revolution of the ring-shaped core for sensing two orthogonal components of the magnetic field vector to which the core is exposed, such as the earth's field or the field of a magnet.

While the aforecited prior art system provides two axis measurement of the magnetic field vector and provides measurements of magnetic field vector and gradients it is desirable to provide a system which can measure more than two components of the magnetic field vector and preferably a system which can measure the three orthogonal components of the magnetic field vector and gradients thereof, whereby the sensed magnetic field vector can be more completely described.

It is also known from the prior art that a magnetometer-gradiometer system can be constructed for measuring a component of the magnetic field vector and for measuring gradients of the sensed magnetic field vector components. Such a magnetometer-gradiometer fluxgate system is disclosed in U.S. Pat. No. 3,065,413 issued Nov. 20, 1962. The gradiometer portion of this sensor included a pair of magnetic field fluxgate sensors axially spaced apart with circuitry for comparing the magnitude of the two sensed components of the magnetic field vector to derive a difference therebetween. This difference being indicative of the gradient of the sensed component of the magnetic field taken in the direction of the spacing between the pair of fluxgate magnetic field sensors.

This latter system also included phase sensitive detection of the sensed magnetic field signal in the sensor coil against a harmonic of the driver signal to determine the direction of the gradient. This system also employed a dc feedback signal, of a magnitude corresponding to the magnitude of the sensed magnetic field component, which was fed back to coils coupled to the core for nulling or cancelling, in the core, the sensed component of the magnetic field to achieve higher sensitivity of the magnetic field measurement.

It is also known from the prior art that the feedback component for cancelling, in the core, the magnetic field component to be measured can be fed back through the magnetic field sensing coil, thereby eliminating the requirement for a separate feedback coil on the core of the sensor. Such a system is disclosed in U.S. Pat. No. 2,485,847 issued Oct. 25, 1949.

SUMMARY OF THE PRESENT INVENTION

The principal object of the present invention is the provision of an improved fluxgate type magnetic sensor.

In one feature of the present invention, the core of a fluxgate type magnetic field sensor has three field sensing coils magnetically coupled thereto with the magnetic axes of the three sensing coils angularly displaced relative to each other for separately sensing three different time varying signal components with individual magnitudes corresponding to the magnetic field vector components colinear with the respective magnetic axes of the three sensing coils.

In another feature of the present invention, the three magnetic sensing coils which are coupled to the magnetically permeable core have their magnetic axes disposed in mutually orthogonal relation for sensing three mutually orthogonal magnetic field components of the magnetic field vector to be sensed.

In another feature of the present invention, one of the magnetic sensing coils has a magnetic axis substantially colinear with the axis of revolution of the loop-shaped magnetic core.

In another feature of the present invention, the magnetic field sensing windings are wound on a bobbin enclosing the magnetic core of the fluxgate sensor.

In another feature of the present invention, a pair of flux-gate magnetic field sensors are provided at the ends of an elongated bobbin holder having indexing means at opposite ends thereof for receiving and indexing the pair of bobbins onto which the magnetic sensing coils of the respective sensors are wound.

In another feature of the present invention, a bracket pivotably supports an elongated bobbin holding a pair of flux-gate magnetic field sensors at opposite ends thereof, whereby the axis of the pair of magnetic field sensors can be adjustable by pivoting the elongated bobbin holder in the bracket.

In another feature of the present invention, the bracket which holds the elongated bobbin holder is rotatable about an axis of rotation orthogonal to a pivoting axis of the bobbin holder in the bracket, whereby two degrees of freedom are achieved in adjustment of the axis of the pair of fluxgate sensors.

Other features and advantages of the present invention will become apparent upon a perusal of the following specification taken in connection with the accompanying drawings wherein:

BRIEF DESCRIPTION OF THE DRAWINGS

FIG. 1 is a schematic diagram, partly in block diagram form, depicting a fluxgate magnetic sensor incorporating features of the present invention, FIG. 2 is a perspective view of a three-axis magnetic sensor of the present invention, FIG. 3 is an exploded view of the structure of FIG. 2, FIG. 4 is an exploded view of a pair of three axis sensors as carried at opposite ends of an elongated holder, FIG. 5 is a perspective view of the structure of FIG. 4 as mounted in an adjustable bracket, and FIG. 6 is a sectional view of the structure of FIG. 5 taken along line 6—6 in the direction of the arrows.

DESCRIPTION OF THE PREFERRED EMBODIMENTS

Referring now to FIG. 1, there is shown a three-axis flux-gate type magnetic sensor circuit 1 incorporating features of the present invention. The sensor circuit 1 includes a fluxgate magnetic sensor element 2 comprising a magnetically permeable cylindrical core 3, as of five turns of Supermaloy 0.00025 inch thick tape, having a permeability of several hundred thousand and manufactured by Dynacore, Inc. The tape has a width and thus the core length in the z direction which is approximately equal to the diameter of the core. A driver winding 4 is wound on the core 3 and comprises, in a typical example, 100 turns of 36 AWG formvar insulated wire. The magnetic axis of the driver coil 4 forms a circular loop inside the core and lying in the XY plane disposed midway lengthwise of the core 3.

Three mutually orthogonal sensor coils 5, 6 and 7 lying in the ZY, ZX and XY plane, respectively, are wound around the core 3 and winding 4. Magnetic field sensor coils 5, 6 and 7 have mutually orthogonal magnetic axes namely the X axis, Y axis and Z axis, respectively, for sensing magnetic field components in the X, Y and Z direction, respectively. The leads to the respective coils 4–7 are brought away from the sensor 2 in the form of a twisted pair with one of the leads being grounded and the other having a terminal for connection to other parts of the circuit.

The driver coil 4 is excited with driver current of a fundamental frequency $f_1$ as derived from a driver source 8. In a typical example, the fundamental frequency of the driver $f_1$ is 100 kHz. The current supplied to the driver coil is sufficient to drive the core 3 into substantial saturation at the peak of each half cycle of the driver current such that the core is saturated at twice the fundamental driver frequency, namely, $2 f_1$. The respective field sensing coils are magnetically decoupled from the driver coil 4. More particularly, the magnetic axes of the Z coil 7 and the driver coil 4 are mutually orthogonal such that there is no mutually inductive coupling therebetween. As to the X and Y coils 5 and 6, symmetry of these coils relative to the driver coil and because they encircle the driver coil, the current induced in opposite halves of each of these field sensing coils is equal and opposite such that there is a net zero inductive coupling to sensing coils 5 and 6 from the driver coil 4.

Since the driver coil 4 drives the core 3 into saturation at twice the driver frequency, the permeability of core 3 is modulated at twice the driver frequency. Thus, the external field to be sensed is gated into these coils at twice the driver frequency. Accordingly, an electrical field sensing signal voltage is induced in each of the sensor coils 5, 6 and 7 at even harmoncis of the driver frequency, such harmonic voltage signal having an amplitude proportional to that component of the external magnetic field vector to be sensed which is parallel to the respective magnetic axes of the respective sensing coils 5–7.

The magnetic field sensing signal voltage at a frequency of $2 f_1$ is coupled into one input of a phase sensitive detector 9 for synchronous detection against a reference signal of a frequency of $2 f_1$ derived from the driver 8 by doubling in doubler 11 to derive the reference input frequency at $2 f_1$ to the phase sensitive detector 9. A phase shifter 12 is provided in the reference line for adjusting the phase of the reference signal relative to the phase of the magnetic field signal to compensate for phase shifts in field signal induced in the sensor coil relative to the phase of the driver signal.

The output of the phase sensitive detector is a dc signal having a sign determinative of the direction of the sensed magnetic field vector component and having an amplitude corresponding to the magnitude of the sensed magnetic field vector component. The output of the phase sensitive detector is amplified in amplifier 13 and fed to output terminal 14. A portion of the dc output at terminal 14 is fed back via feedback resistor 15 to the sensing coil 6 to produce a dc magnetic field component for bucking out the component sensed by the sensing coil 6. In this manner, a null measuring system is obtained such that the gain of amplifier 13 can be relatively high for improved accuracy and stability.

Each of the respective field sensor coils 5, 6 and 7 includes a respective phase sensitive detector 9, amplifier 13 and feedback resistor 15 to produce three dc output magnetic field signals each corresponding to a mutually orthogonal component of the total magnetic field vector to be sensed by sensor 2.

Referring now to FIGS. 2 and 3 there is shown a physical realization of the field sensor 2. The X, Y and Z coils 5, 6 and 7 are wound in respective orthogonal grooves in a non-magnetic bobbin 18, as of Lucite plastic. The bobbin 18 is formed in two mutually interdigitated half sections 19 and 21 which are identical and merely rotated by 90° relative to each other for nesting. The bobbin 18 is hollow to enclose the core 3 and driver winding 4.

Referring now to FIG. 4 there is shown a gradiometer arrangement wherein a pair of fluxgate magnetic sensors 2 are disposed at opposite ends of a bobbin holder 22, as of Lucite plastic. The bobbin holder is cylindrical and includes, at each end, three axially directed quadraturally spaced lugs 23 for registration within the grooves of the sensor bobbins 18 to assure precise angular alignment of the sensors 2 relative to each other. More particularly, to assure that the respective magnetic axes of each of the X, Y and Z coil pairs are colinear. In a typical example, the sensors 2 are axially spaced by approximately 4 inches such that by subtracting the signals in the respective coil pairs a gradient of that respective magnetic field component in the Z direction is obtained. More particularly, by subtracting the two X magnetic field signals, a difference signal component is obtained which is proportional to $\Delta H_x/\Delta Z$ for the X coils, $\Delta H_y/\Delta Z$ for the Y coils, and $\Delta H_z/\Delta Z$ for the Z coils. The sensors 2 are fixedly secured to the ends of the bobbin holder 22, as by non-magnetic cement or tape.

Referring now to FIGS. 5 and 6, the gradiometer sensing unit of FIG. 4 is pivotably mounted to a base plate 25 via the intermediary of a rotatable disc 26 to which a U-shaped bracket 27 is affixed by means of a bolt 28 passing through aligned holes in an arched bottom portion 29 of the bracket 27, disc 26 and base plate 25. The spring action of the arched bottom portion 29 of the bracket 27 provides a spring action on the bolt 28 such that a friction force is produced between the rotating disc 26 and the base structure 25 which allows the bracket to be rotated about the bolt 28 but held by the friction in the position as set.

A pair of horizontally directed pins 31 extend inwardly from the upstanding legs of the bracket 27 for receipt within horizontally directed axially aligned central bores in the side of the bobbin holder 22 to provide a trunion support for the bobbin holder relative to the bracket 27 such that the bobbin holder is pivotable about the axis of pins 31 to provide a second degree of freedom in the alignment of the gradiometer sensor.

The advantage of the fluxgate magnetic sensor of the present invention is that it permits accurate measurement of the mutually orthogonal components of the magnetic field vector to be sensed. The gradiometer embodiment permits accurate gradient measurements of these three orthogonal magnetic field components.

What is claimed is:

1. In a fluxgate magnetic sensor:
core means comprising a loop of a magnetically permeable material for permeation by a magnetic field vector to be sensed;
means for producing a time varying permeability of said core means;
first, second and third magnetic field sensing coils having three different non-coplanar magnetic axes magnetically coupled to said common core loop for having induced therein three different time varying signal components of magnitudes corresponding to the magnitudes of three different non-coplanar components of the magnetic field vector which are colinear with the magnetic axes of the respective ones of said three sensing coils.

2. The apparatus of claim 1 wherein said means for producing a time varying permeability of said core means includes, an electrical driver coil magnetically coupled to said core means to be energized with a time varying current.

3. The apparatus of claim 2 wherein said driver coil is a winding on said core means.

4. The apparatus of claim 1 wherein each of said first, second, and third sensing coils encircles said entire magnetic permeable loop of said core means without passing through said magnetic permeable loop.

5. The apparatus of claim 1 wherein the diameter of said core loop is approximately equal to the axial length of said core loop.

6. The apparatus of claim 5 wherein said core loop is a hollow right circular cylinder.

7. The apparatus of claim 1 wherein the magnetic axes of said first, second and third sensing coils are mutually orthogonal.

8. The apparatus of claim 3 wherein said core means includes a closed loop of magnetic material, and wherein said driver coil winding has a circular magnetic axis lying in a plane perpendicular to the axis of revolution of the magnetic loop.

9. The apparatus of claim 8 wherein said first and second coils have mutually orthogonal magnetic axes lying in a plane normal to the axis of revolution of said magnetic core means.

10. The apparatus of claim 9 wherein said third sensing coil has a magnetic axis substantially colinear with the axis of revolution of said magnetic core means.

11. The apparatus of claim 9 including, bobbin means enclosing said magnetic core means and having a set of three mutually orthogonal grooves therein to receive said first, second and third magnetic field sensing coils, respectively.

12. The apparatus of claim 11 including, an elongated bobbin holder means having indexing means at opposite ends thereof for receiving and indexing first and second ones of said bobbin means at opposite ends of said bobbin holder means.

13. The apparatus of claim 11 wherein said bobbin means comprises a pair of interlocking half portions.

14. The apparatus of claim 1 including, phase sensitive detecting means for detecting the respective induced signal components in said respective first, second and third magnetic field sensing coils against a reference signal derived from said means for producing the time varying permeability of said core means to derive first, second and third dc output signals.

15. The apparatus of claim 14 including, first, second and third feedback means for feeding back to said respective first, second and third sensing coils a portion of said respective dc output signals for producing dc field components to cancel said magnetic field vector to be sensed.

16. The apparatus of claim 12 including, bracket means for pivotably and supportively engaging said elongated bobbin holder means intermediate the length of said bobbin holder means.

17. The apparatus of claim 16 including, means for pivotably supporting said bracket means for rotation of said bracket about an axis of rotation orthogonal to the axis of rotation of said elongated bobbin relative to said supportive bracket means.

18. The apparatus of claim 4 wherein said third field sensing coil has a magnetic axis parallel to the axis of revolution of said coil and is wound encircling said core and is entirely external of the said loop of said core.

19. The apparatus of claim 4 wherein said first, second and third field sensing coils have mutually orthogonal magnetic axes and are wound encircling said core all being entirely external of said loop of said core.

* * * * *